United States Patent [19]
Wagner et al.

[11] Patent Number: 5,088,182
[45] Date of Patent: Feb. 18, 1992

[54] TURRET CHANGER

[75] Inventors: Ted R. Wagner, New Bremen, Ohio; Christopher D. Sanderson, Skipton, England

[73] Assignee: The Monarch Machine Tool Company, Sidney, Ohio

[21] Appl. No.: 570,036

[22] Filed: Aug. 20, 1990

[51] Int. Cl.⁵ .......................................... B23Q 3/155
[52] U.S. Cl. .......................................... 29/568
[58] Field of Search .......................... 29/568; 408/35

[56] References Cited

U.S. PATENT DOCUMENTS

| | | | |
|---|---|---|---|
| 4,656,726 | 4/1987 | Suzuki et al. | 29/568 |
| 4,675,977 | 6/1987 | Kolblin et al. | 29/568 |
| 4,776,081 | 10/1988 | Okunishi et al. | 29/568 |

FOREIGN PATENT DOCUMENTS

| | | | |
|---|---|---|---|
| 156141 | 9/1982 | Japan | 29/568 |
| 120003 | 5/1988 | Japan | 29/568 |
| 78708 | 3/1989 | Japan | 29/568 |
| 177937 | 7/1989 | Japan | 29/568 |
| 1352681 | 5/1974 | United Kingdom | |

*Primary Examiner*—Daniel W. Howell
*Attorney, Agent, or Firm*—Pearne, Gordon, McCoy & Granger

[57] ABSTRACT

A machine tool such as a lathe having an automatically changeable tool turret and a turret changer, carried on the bed of the machine, that dismounts a turret from a spindle of a turret index unit and mounts a replacement turret thereon. Transfer of a turret between the changer and the spindle is accomplished by axial and rotary movements produced by components that are associated with the index unit and that provide other functions during regular turret indexing and machining operations. The turret mounts on the spindle with a bayonet-type connection. The changer includes a pair of opposed arms that each carry a turret and that alternately swing into alignment with the spindle.

23 Claims, 4 Drawing Sheets

TURRET CHANGER

The invention relates to improvements in machine tools and, in particular to automatic changing of tool turrets.

PRIOR ART

It is common in the machine tool art to automatically exchange tools under the control of a computer. U.S. Pat. Nos. 4,675,977 and 4,776,081 show multi-tool heads and automatic devices for changing such heads.

SUMMARY OF THE INVENTION

The invention provides machine tool apparatus useful with lathes including chuckers and universal types, for example, by which rotary indexable tool turrets are automatically changed. The apparatus includes a turret changer mounted on the machine bed and alignable with the turret index unit. Identical turret assemblies, each carrying different tooling arrangements are releasably gripped on arms of the changer for manipulation on and off the spindle of the turret index unit. The turret changer, turret assemblies and turret indexer unit each have cooperating elements that accomplish accurate and reliable exchange of the turret assemblies between the changer and turret index unit.

The turret changer has identical opposed arms that swing on a pivot shaft preferably about a vertical axis. A changer arm grasps a retention knob on a turret assembly coincident with the turret axis. Retention knob grippers in the arm are spring applied and hydraulically released. As the arms swing, the turret assembly that has completed its work is carried away from a turret changing station and a replacement turret assembly is carried into this station. The turret index unit approaches, dwells at and retreats from changing station at appropriate times.

The turret assembly has a spring biased pressure plate for mounting onto the turret spindle of the turret index unit. The spring retention force of a turret changer arm exceeds the turret assembly mounting spring force thereby enabling the changer arm to displace the pressure plate and dismount the turret assembly from the turret spindle. The turret assembly is mounted to the spindle by a unique bayonet-type interlock that employs turret spindle rotation for relative angular movement with the turret assembly to effectuate the requisite twist locking action. The turret index unit includes a turret position locking means that accurately locates the angular position of the turret assembly and positively holds the same with a force greatly exceeding the mounting force of the pressure plate.

DESCRIPTION OF THE PREFERRED EMBODIMENT

Figure 1:
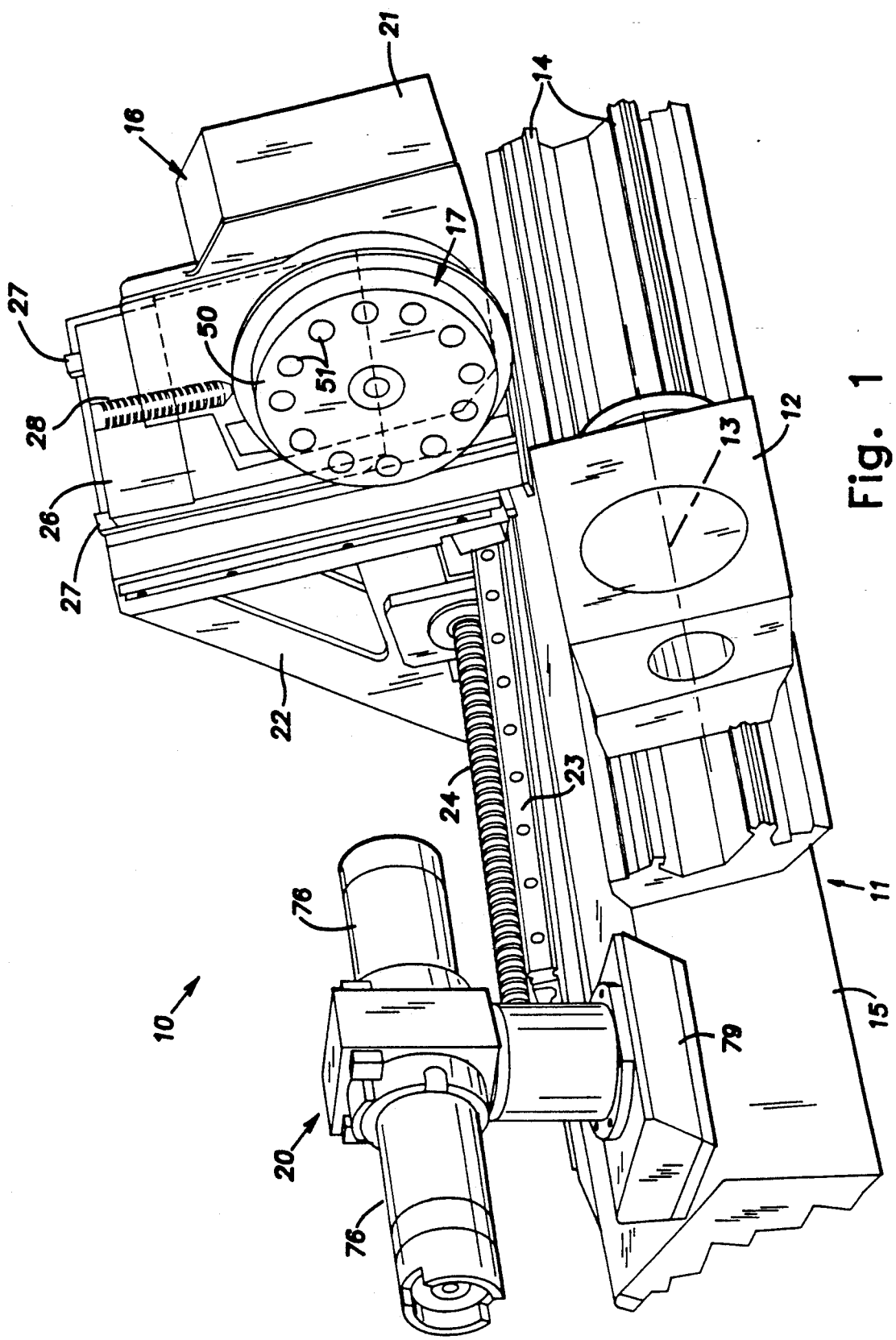
FIG. 1 is a fragmentary diagrammatic perspective view of a machine tool embodying the present invention.

Apparatus 10 and methods embodying the invention are described herein as applied to a machine tool such as a lathe 11 which includes a headstock or work holding station spindle 12 adapted to rotate a workpiece about an axis 13. Parallel to the headstock axis 13 are ways 14 on which is supported a tail stock (not shown) in a generally conventional manner. The frame or bed of the lathe 11 is indicated at 15. A tool turret index unit 16 carries a replaceable tool turret assembly 17. A turret spindle 18 (FIG. 2) rotates about an axis 19 parallel to the headstock or work axis 13. A turret changer 20 mounted on the bed 15, in a manner explained below, exchanges one tool turret assembly 17 carrying an array of tools for another turret assembly carrying a different array of tools.

The index unit 16 includes a housing 21 on a carriage 22 that moves in translation on ways 23 parallel to the work axis 13. A power-operated ball screw 24 is used to automatically drive the carriage 22 along the axis of the ways 23. A slide 26 on the carriage 22 supports the housing 21 for translatory movement along another axis which is radial to the work axis 13. The slide 26 moves on guiderails 27 and is power-operated automatically by a ball screw 28. From the foregoing it will be understood that the turret index unit 16 is power-operated and guided for movement along two axes, one parallel to the work axis 13 and the other radial to the work axis.

Within the index unit housing 21 are drive elements to rotationally index the turret assembly 17 between a predetermined number of equally spaced angular positions which in the illustrated case is twelve in number. In a manner described below, a turret assembly 17 is clamped to the turret spindle 18. The spindle 18, which is rotatably mounted within the housing 21, is rotationally indexed by a drive motor 31 connected through a drive belt 32 and a gear train including gears 33–35. Between successive machining operations, the turret assembly 17 is rotationally indexed between selected angular positions to locate a desired tool in a working station. The turret assembly 17 is precisely angularly located by a curvic coupling that includes curvic teeth 48 on a mounting ring 37 fixed by bolts to the turret assembly 17 and complementary curvic teeth 49 machined on a ring end face 38 of a cylinder 36 fixed to the turret index unit housing 21.

Axial movement of the spindle 18 to disengage the curvic teeth of the coupling rings 37, 38 and thereby permit rotary indexing action is accomplished automatically by pressurizing an annular hydraulic chamber 39 and exhausting a larger opposed annular hydraulic chamber 40. This causes a hollow piston 41 to shift the spindle 18 outwardly (to the left in FIG. 2). Thrust bearings 42 are provided on opposite ends of the piston 41 for transferring axial forces to the spindle 18. Axial motion in the opposite direction, to engage the teeth of the coupling rings 37, 38 is accomplished, conversely, by pressurizing the larger chamber 40 and exhausting the smaller chamber 39. When, in the former mode, the spindle 18 has moved to the left under the influence of the hollow piston 41 a friction surface 46 fixed on the spindle engages an annular surface 47 fixed to the gear 35 thereby rotationally coupling the spindle to this gear. This enables the motor 31 to positively rotationally move the spindle 18 to a desired angular location. The angular position of the spindle 18 and turret assembly 17 is monitored by an electronic angular resolver in a known manner.

The turret assembly 17 has a plurality of tool receiving sockets 51 equally angularly spaced on its radial face 50 that correspond to the indexing locations of the turret assembly. A typical tool is illustrated at 55 in FIG. 2. A tool drive shaft 52 is aligned with the working tool station of the turret, i.e. the position where the socket 51 holding the active tool is located. The drive shaft 52 at one end is driven by the motor 31 through the gears 33-35 and has an internal spline 53 capable of driving rotary or live tooling in a known manner.

Figure 4:
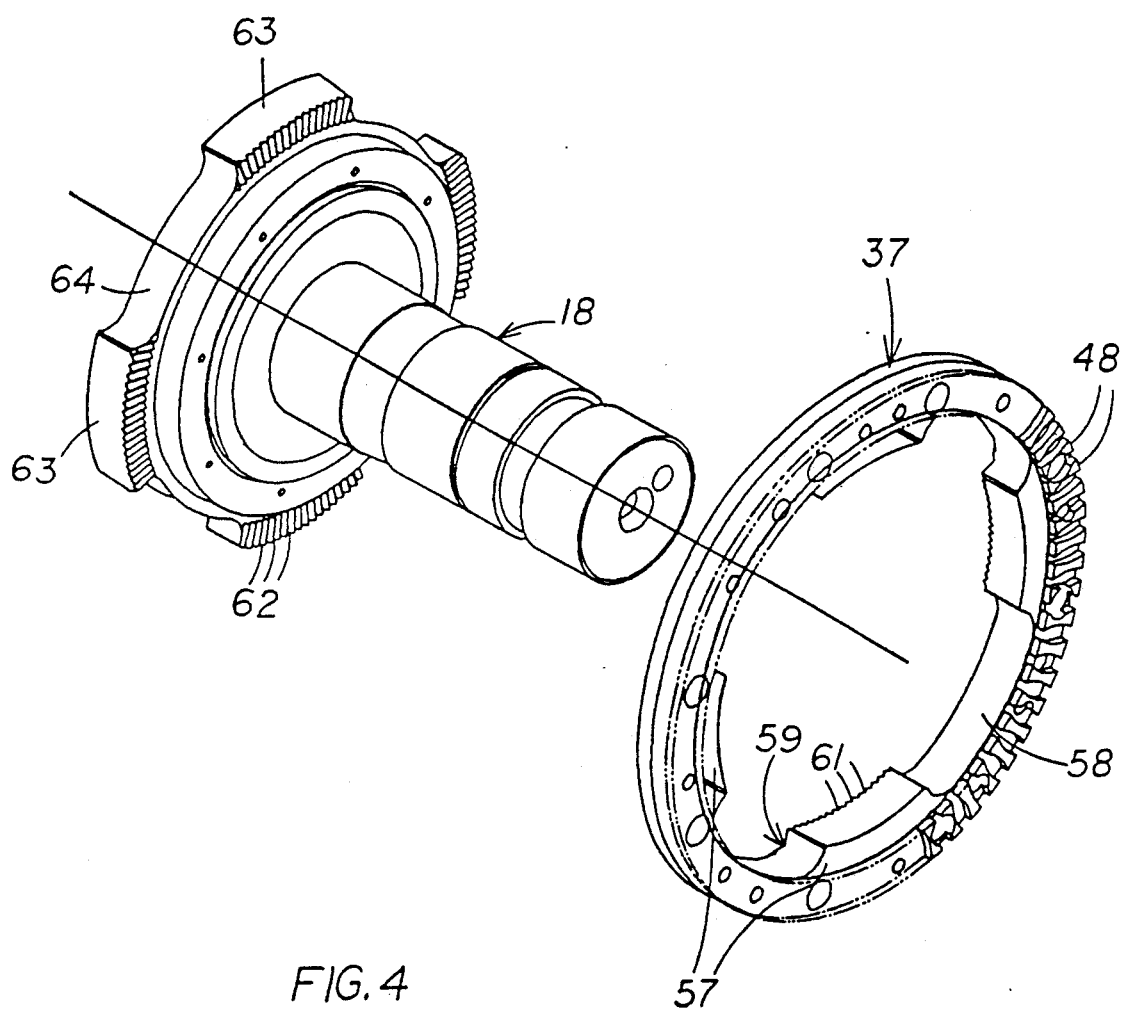
FIG. 4 is a perspective exploded view of the spindle of the turret index unit and a mounting ring of a turret assembly which elements comprise a bayonet-type connection for automatically mounting a turret assembly on the turret unit spindle.

The turret assembly 17 has a generally circular arrangement and comprises a main disc body 54, the coupling ring 37 and a pressure plate 56. As seen in FIG. 4, the coupling ring 37 which is rigidly fixed to the main body 54 has a set of arcuate sections 57 equally spaced angularly about the rotational axis of the turret assembly 17. Arcuate gaps 58 exist in the spaces intervening these sections 57. On an inner face 59 of the ring 37, i.e. a side facing towards the main body 54, the sections 57 have spindle mounting teeth 61 arranged concentrically with the turret assembly axis. The mounting teeth 61 engage with complementary teeth 62 on a rear face of spindle flange sections 63 equally angularly spaced about the axis of the turret spindle 18. The axially oriented teeth 61 project into the recesses between the axially oriented teeth 62 and vice versa. Intervening the flange sections 63 are arcuate gaps 64.

As can be understood from FIG. 4, when the turret carried coupling ring 37 and the spindle 18 are properly angularly oriented, the ring sections 57 are adapted to pass through the gaps 64 and the flange sections 63 are adapted to pass through the gaps 58. As discussed more fully below, the sections 57, 63 provide a bayonet-type connection for mounting the turret assembly 17 to the spindle 18. When the turret assembly 17 is fully mounted on the spindle 18, the sections 57 and 63 are in registry with their teeth 61, 62 interengaged. The pressure plate 56 under the influence of angularly spaced packs 66 of Belville springs keeps the mounting teeth 61, 62 in tight interengagement thereby releasably mechanically locking the turret assembly 17 onto the spindle 18.

Figure 2:
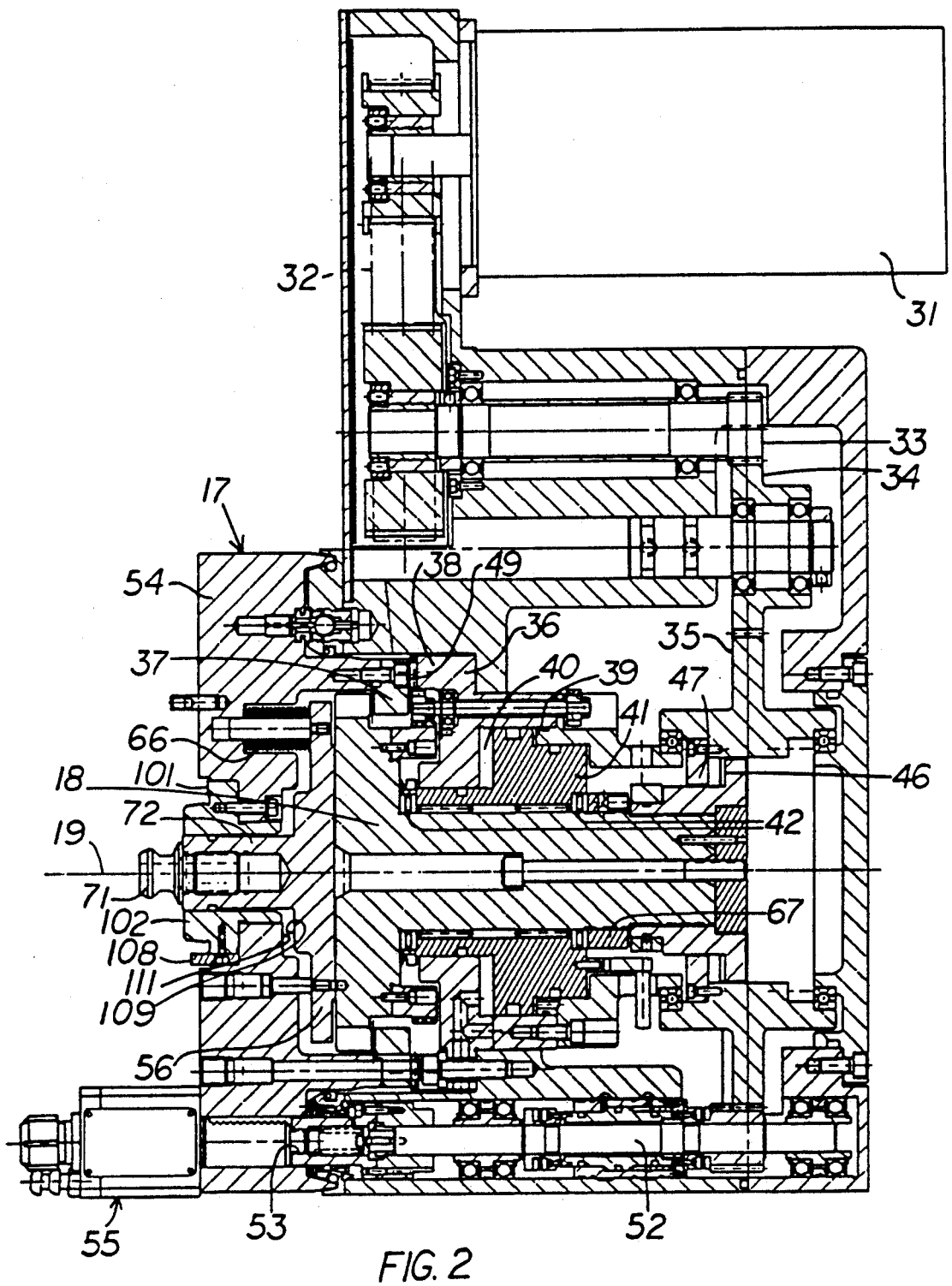
FIG. 2 is a cross-sectional view of a turret index unit taken in a plane through the axis of the spindle thereof.

It can be seen from FIG. 2 that when the turret assembly 17 is installed on the spindle 18 the force of pressure in the annular chamber 40, maintained during machining operations and working through the piston 41, rightward thrust bearing 42 and a collar 67 fixed to the spindle, forces the spindle to the right so that this hydraulic force is applied in addition to the mechanical force developed by the Belville springs 66 to increase the retention forces keeping the turret and spindle mounting teeth 61, 62 in interengagement. This hydraulic clamping force is also applied through the mounting ring 37 to the associated curvic teeth 48 of such ring and the ring face curvic teeth 49.

Figure 3:
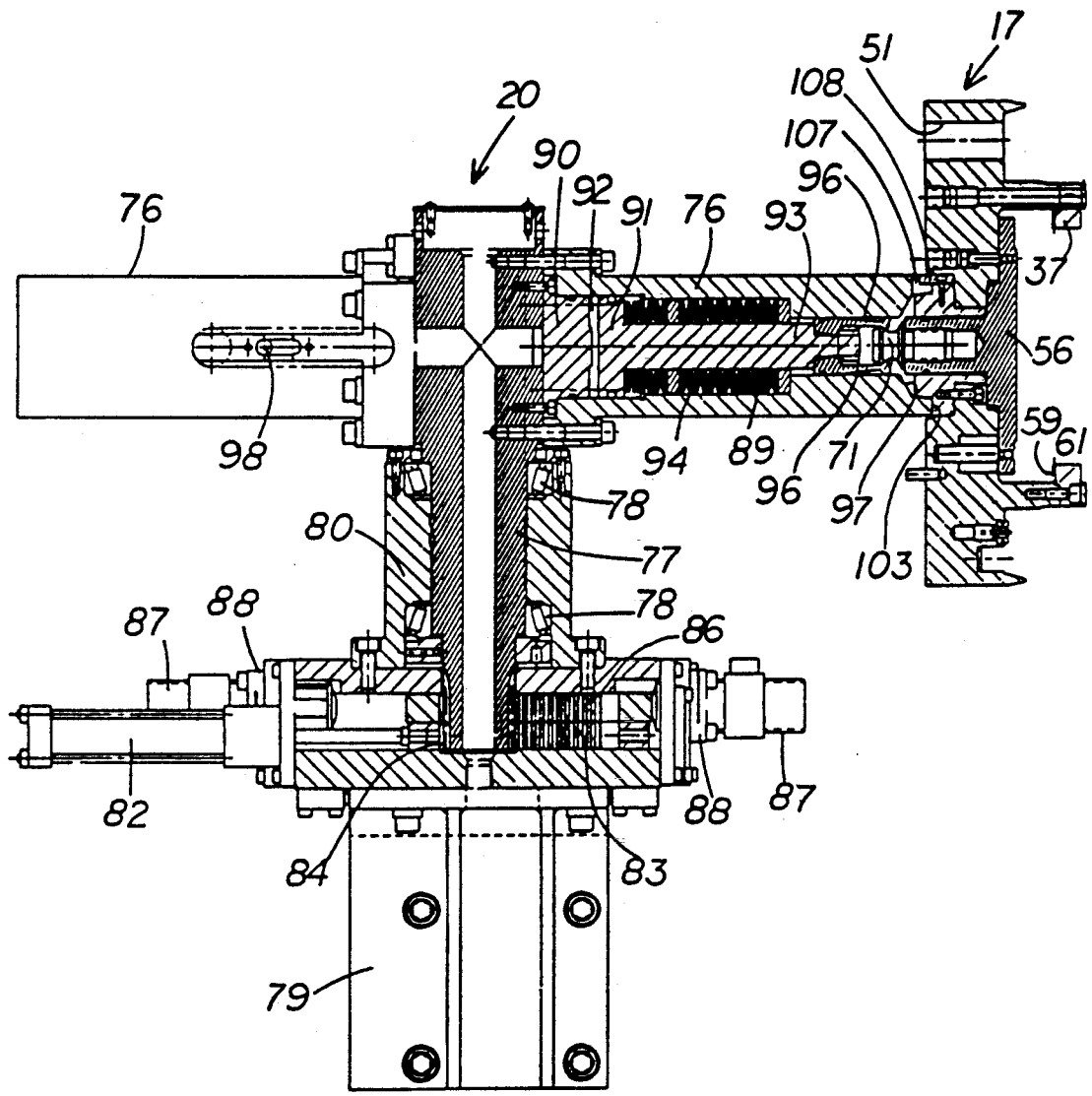
FIG. 3 is an elevational view partially in section of a turret changer mounted on the bed of the machine tool.

The turret assembly 17 includes a retention knob 71 extending axially from its center. The retention knob 71 is threaded into an axial bore in a cylindrical stub 72 on the axis of the pressure plate 56. The retention knob 71, with its exterior surface formation, provides means for coupling with either of a pair of opposed identical arms 76 of the turret changer 20. One of the arms 76 is operative to remove a turret assembly 17 with tools that have completed their work from the turret spindle 18 and the other is operative to carry a replacement turret assembly 17 with tools set up to perform the next work sequence into position to be mounted on the turret spindle 18. With reference to FIG. 3, the arms 76 are fixed by bolts to a vertical shaft 77 that pivots or rotates on tapered roller bearings 78 about a vertical axis. The roller bearings 78 are rigidly supported in a vertical post 80 that is rigidly and fixedly mounted on the bed 15 by a bracket 79. The rod 81 of a double-acting hydraulic piston and cylinder actuator 82 is rigidly coupled to a gear rack 83 that meshes with an integral gear on a lower end of the shaft 77. The rack 83 is guided for movement in translation in a horizontal plane.

Displacement of the rack 83 by operation of the actuator 82, under automatic control, causes the shaft 77 to be moved selectively in either rotary direction through 180°. A second rack 86 immediately above the first rack 83 and guided for horizontal translation serves to eliminate backlash between the teeth of the integral gear 84 and the power-operated rack 83 at the end of each stroke. The anti-backlash rack 86 is constrained at each end of its stroke by a respective hydraulic shock absorber 87. The shock absorbers 87 are each precisely positioned with respect to the anti-backlash rack 86 by virtue of an associated threaded mounting block 88 that provides a micrometer-like screw, clamped adjustment for its respective shock absorber. The shock absorbers 87 are adjusted to stop the shaft 77 and therefore the arms 76 at precisely the correct angle so that the arms align parallel with the rotational axis of the turret. Lines (not shown) in the shaft 77 and arms 76 conduct pressurized air under suitable automatic controls to the free end of the arms to blow out any debris or chips before a turret assembly 17 is grasped by an arm. The arm 76 has a central stepped bore 89 that is closed at an end adjacent the shaft 77 by a plug 90. A hydraulic piston 91 operates in the bore 89 adjacent the plug 90. A hydraulic chamber 92 is formed between the plug 90 and the piston 91. Hydraulic passages (not shown) are provided axially through the wall of the shaft 77 and through the plug 90 for conveying hydraulic fluid under suitable automatic machine controls to pressurize or exhaust the chamber 92. The chamber 92 of each arm 76 is hydraulically controlled independently of the chamber of the other arm. The piston 91 has an integral rod 93 of reduced diameter on which is assembled a plurality of Belville springs 94. The Belville springs function to resiliently mechanically bias the piston 91 towards the plug 90.

A set of gripper fingers 96 are attached to the end of the rod 93 remote from the piston 91. The fingers operate in the adjacent end of the bore 89 that terminates in a socket opening 97 at the free end of the arm 76. When pressurized hydraulic fluid is admitted to the chamber 92, under automatic machine control, the piston 91 compresses the springs 94 and moves the fingers 96 to an open position where their ends extend axially out of the bore 89 and radially out a sufficient distance to receive the turret assembly retention knob 71. When the chamber 92 is exhausted of high pressure hydraulic fluid under automatic control, the springs 94 act to draw the fingers 96 into the bore to grasp the retention knob 71 in a known manner.

Details of the operation of the machine tool apparatus 10 to allow the changer 20 to automatically substitute one tool carrying turret assembly 17 for another on the turret index unit spindle 18 follow. This exchange normally occurs when a turret assembly 17 previously mounted on the spindle 18 and carrying tools that have completed their work is to be replaced with another turret assembly set up with different tooling for subsequent work. Automatic controls of the machine 10 cause the index unit 16 to move on its slide 26 to a transfer position where the turret spindle rotational axis is coincident with the longitudinal axis of the tool changer arms 76 when such arms are in a stop position parallel to the work axis 13. As FIG. 1 shows, in their stop position, the arms 76 are laterally offset from the work axis 13 so that the turret can pass along the carriage ways 23 clear of parts of the machine such as the headstock 12 adjacent the changer 20. The changer 20 is positioned with one arm 76 ready to receive the retention knob 71 of the turret assembly 17 to be replaced and the turret carriage ball screw 24 is energized to move the turret assembly on the carriage ways 23 parallel to the work axis 13 towards the tool changer arm 76.

The hydraulic chamber 92 of the adjacent receiving arm 76 is pressurized to extend and open the gripper fingers 96 out of the arm bore 89. A proximity sensor (not shown) can be used to sense a pin 98 (shown as typical in the arm 76 on the left in FIG. 3) projecting through a axial slot in the wall of the arm and fixed on the piston rod 93 to verify that the piston 91 has opened the fingers 96. The turret carriage 22 is advanced automatically by operation of the ball screw 24 towards the changer 20 causing the retention knob 71 to be received in the open fingers 96. The turret carriage stops with a flange 101 of a nose cone 102 fixed at the center of the turret face 50 stopping just short of contact with an end face 103 of the arm 76, the spacing being, for example, 1 mm.

A slot 107 can be provided on the arm end face 103 to receive a key 108 fixed on the turret nose cone 102 to assure that the turret assembly 17 is in proper angular orientation when it is received on the arm 76. The hydraulic chamber 92 of the receiving arm 76 is exhausted to allow the springs 94 to return the piston 91 and draw the fingers 96 into the bore 89 and into a grip on the retention knob 71. The pressure plate stub 72 in which the retention knob 71 is fixed, is slidable in a central bore in the nose cone 102. The force of the arm springs 94 is greater than that of the turret pressure plate springs 66 so that the pressure plate 56 is drawn with the retention knob 71 towards the arm 76 and away from the spindle 18; opposed surfaces 109, 111 of the pressure plate and main turret body 54 respectively contact.

At this point, the retention knob 71 is safely gripped in the bore 89 by the fingers 96 and the turret assembly 17 is still clamped by the spindle 18 against the stationary indexing ring teeth 38 by hydraulic pressure in the annular chamber 40. This hydraulic pressure is now relieved and hydraulic pressure is applied to the opposed smaller annular hydraulic chamber 39 to move the spindle 18 outwardly towards the arm 76. The spindle 18 moves a distance sufficient to completely disengage the spindle and turret ring section teeth 61, 62 and to establish driving contact between the friction surface 46 carried with the spindle and the annular surface 47 carried with the gear 35. Initial axial movement of the spindle 18 allows the turret nose cone 102 to close completely against the end face 103 of the arm 76. At this time, the arm 76 supports the turret assembly 17 in space and against rotation. The turret index drive motor 31 is operated to rotate the spindle 18 through the gears 33-35 and friction surface 46 through 45° so that the mounting ring sections 57 align with the clearance gap 64 between the spindle flange section 63. At this point, the turret assembly 17 is released from the turret spindle 18. The turret carriage 22, by automatic operation of the ball screw 24 is retracted to carry the index unit 16 away from the changer arm 76 a distance sufficient to allow the just transferred turret assembly 17 to swing in a horizontal plane about the vertical axis of the changer shaft 77 without interference between the rear face or periphery of the turret assembly 17 and the indexer unit housing 21.

The changer piston and cylinder actuator 82 is operated to rotate the shaft 77 180° to swing the turret assembly 17 away from the index unit 16. An opposite arm 76 simultaneously swings a replacement turret assembly, being carried by its retention knob 71 and nose 102 in the end of the arm, into position to be received onto the turret spindle 18. Thereafter, the index unit carriage 22 is advanced automatically by operation of the ball screw 24 towards the replacement turret assembly and the above-described transfer steps between the index unit 16 and changer 20 are reversed to automatically mount the replacement turret on the turret spindle 18.

The machine tool lathe disclosed herein is of modular construction and can be embodied in numerous configurations such as a chucker, a universal lathe, a lathe with a powered tailstock, and a lathe with opposed headstocks. Such machine tool configurations can be fitted with one or more of the disclosed turret index units and with one or more of the disclosed turret changers; such index units and changers can be mounted at machine locations different than that disclosed. Where required, the changer or changers can be mounted on slides fixed to the machine bed to enable the entire changer to move with a component of movement lateral to the work axis 13 so as to permit the arms 76 to swing without interference with a machine element or safety enclosures for the same.

It should be evident that this disclosure is by way of example and that various other changes may be made by adding, modifying or eliminating details without departing from the fair scope of the teaching contained in this disclosure. The invention is therefore not limited to particular details of this disclosure except to the extent that the following claims are necessarily so limited.

We claim:

1. A machine tool having a bed and a work holding spindle mounted on the bed for turning a workpiece, a turret index unit mounted on the bed and having a spindle, a tool turret removably mounted on the index unit spindle, means for supporting the index unit for movement on the bed along at least one axis to machine a workpiece, mounting means for automatically locking the turret on the turret spindle, and coupling means on the turret for coupling with an automatic turret changer whereby the tool turret can be automatically coupled to the turret changer, dismounted from the turret spindle and replaced with another tool turret when the former tool turret has completed its machining operations.

2. A machine tool as set forth in claim 1, wherein said mounting means includes means responsive to relative rotation between said turret and said turret spindle to effect automatic mounting and dismounting of the turret.

3. A machine tool as set forth in claim 2, wherein said coupling means is arranged to allow the turret changer to support the turret against rotation and the mounting means allows the index unit to produce relative rotation between the turret and turret spindle for turret mounting and dismounting action.

4. A machine tool as set forth in claim 1 including turret changer apparatus mounted on said bed, said apparatus providing components for engaging said coupling means.

5. A machine tool as set forth in claim 4, wherein said turret changer apparatus includes a pair of opposed arms pivoted about a common axis between alternate transfer positions.

6. A machine tool as set forth in claim 5, wherein said coupling means includes means causing turret coupling and uncoupling action by motion of the index unit relative to the bed along said at least one axis of said index unit.

7. A machine tool as set forth in claim 1, wherein said mounting means includes interengaging projections and recesses on said turret and said turret spindle and said index unit includes actuator means to automatically clamp said projections and recesses together.

8. A machine tool as set forth in claim 1, wherein said mounting means includes spring means for applying a holding force between the turret and the turret spindle.

9. A machine tool as set forth in claim 8, wherein said spring means is arranged to be carried with the turret when the turret is transferred on and off of the turret spindle.

10. A machine tool as set forth in claim 9, wherein said mounting means includes supplemental clamping means on said index unit operable to produce a retention force for holding a turret on the turret spindle that is in addition to the turret spring means holding force.

11. A machine tool as set forth in claim 10, wherein said clamping means is hydraulically operated.

12. A machine tool having a bed and a work holding station on the bed, a tool turret index unit being movable along an axis and including a turret spindle, a tool turret removably mounted on the turret spindle and having surface formation means adapted to be gripped for exchange purposes, a tool turret changer mounted on the bed, the tool changer having arms pivotal on an axis, the arms having opposed ends, said ends each having means for gripping said turret surface formation means, said gripping means and surface formation means cooperating to interengage upon movement of said index unit relative to said bed along its axis towards said tool changer.

13. A machine tool as set forth in claim 12, wherein said surface formation means of said turret comprises a retention knob coaxial with the turret spindle axis.

14. A machine tool as set forth in claim 12, wherein said pivot axis is substantially vertical.

15. A machine tool as set forth in claim 12, wherein said arms are supported on a vertical shaft, pinion means on said shaft and a power-operated rack in engagement with said pinion means to pivot shaft and said arms.

16. A machine tool as set forth in claim 15 including a second rack in engagement with said pinion means, shock absorber means arranged to restrain pivot movement of said shaft and arms when said arms reach an exchange location in alignment with said spindle axis.

17. A machine tool as set forth in claim 16, wherein said arms are symmetrically arranged on opposite sides of the pivot axis of said pivot shaft, each of said arms having separate gripping means for handling a separate turret.

18. A turret index unit including a spindle rotatable about an axis, a motor for rotating said spindle about said axis, and an automatically changeable tool turret on the spindle, the spindle and tool turret including bayonet mounting means, said mounting means relying on limited relative rotation between the spindle and the tool turret to effect mounting and dismounting therebetween.

19. A turret index unit as set forth in claim 18, wherein said mounting means is operative for mounting and dismounting of said turret in response to limited rotation of said spindle relative to said turret by said motor.

20. A turret index unit as set forth in claim 18, wherein said mounting means includes interengaging projection and recess means on said spindle and tool turret, said projection means being interengageable with limited axial relative movement between said spindle and tool turret, and means to forcibly produce limited axial engagement movement between said projection and recess means.

21. A turret index unit as set forth in claim 20, wherein said axial engagement movement producing means comprises mechanical spring means.

22. A turret index unit as set forth in claim 21, wherein said spring means is carried on said turret.

23. A turret index unit as set forth in claim 22 including hydraulic clamping means operative to assist said mechanical spring means to maintain interengagement between said projection and recess means.

* * * * *